United States Patent
Kwon et al.

(10) Patent No.: US 10,701,686 B1
(45) Date of Patent: Jun. 30, 2020

(54) PROTECTION MECHANISM FOR MULTI-USER TRANSMISSION

(71) Applicant: NEWRACOM, INC., Irvine, CA (US)

(72) Inventors: Young Hoon Kwon, Laguna Niguel, CA (US); Yujin Noh, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 160 days.

(21) Appl. No.: 15/183,570

(22) Filed: Jun. 15, 2016

Related U.S. Application Data

(60) Provisional application No. 62/175,991, filed on Jun. 15, 2015, provisional application No. 62/207,867, filed on Aug. 20, 2015, provisional application No. 62/213,598, filed on Sep. 2, 2015.

(51) Int. Cl.
| | |
|---|---|
| *H04W 72/04* | (2009.01) |
| *H04W 74/08* | (2009.01) |
| *H04W 74/00* | (2009.01) |
| *H04L 5/00* | (2006.01) |

(52) U.S. Cl.
CPC ....... *H04W 72/0446* (2013.01); *H04L 5/0044* (2013.01); *H04W 74/004* (2013.01); *H04W 74/0833* (2013.01)

(58) Field of Classification Search
CPC ........... H04W 72/0446; H04W 74/004; H04W 74/0833; H04L 5/0044
See application file for complete search history.

(56) References Cited

U.S. PATENT DOCUMENTS

| | | | | |
|---|---|---|---|---|
| 10,080,240 | B2* | 9/2018 | Choi | ............... H04W 74/0816 |
| 2008/0080553 | A1* | 4/2008 | Hasty | .................. H04L 1/0002 |
| | | | | 370/468 |
| 2011/0069628 | A1* | 3/2011 | Liu | .................. H04W 74/0816 |
| | | | | 370/252 |
| 2011/0149918 | A1* | 6/2011 | Gong | ................. H04W 72/005 |
| | | | | 370/336 |
| 2011/0176627 | A1* | 7/2011 | Wu | ...................... H04B 7/0452 |
| | | | | 375/260 |

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Hassan Kizou
*Assistant Examiner* — Hector Reyes

(57) ABSTRACT

Protecting a shared wireless channel for use by an access point may be accomplished by generating, by the access point, a control frame that is addressed to a plurality of wireless devices, wherein generating the control frame includes providing a group address in one or more fields of the control frame, and transmitting, by the access point, the control frame to the plurality of wireless devices, wherein the control frame solicits a Clear-to-Send frame from any wireless device in the plurality of wireless devices that satisfies a set of conditions, wherein each Clear-to-Send frame authorizes the access point to perform a downlink transmission on the shared wireless channel.

20 Claims, 12 Drawing Sheets

(56) References Cited

U.S. PATENT DOCUMENTS

2014/0126509 A1* 5/2014 You .................. H04B 7/04
370/329
2015/0063190 A1* 3/2015 Merlin ................ H04L 5/0037
370/312
2015/0365972 A1* 12/2015 Seok ................ H04W 74/0816
370/336
2017/0006612 A1* 1/2017 Nabetani ............... H04W 16/02

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

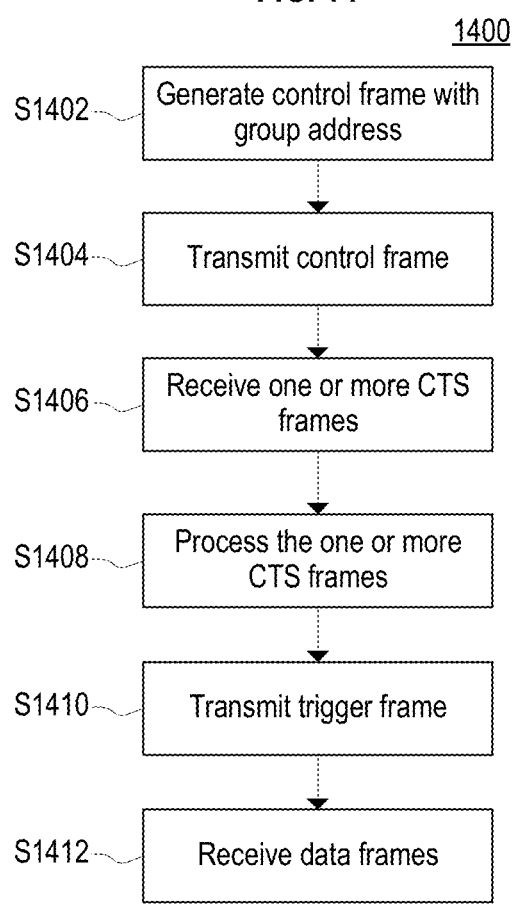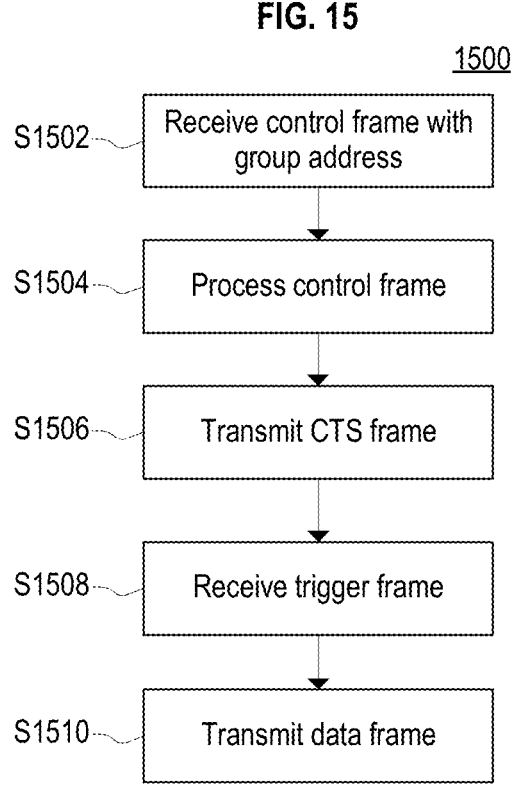
FIG. 14
FIG. 15

PROTECTION MECHANISM FOR MULTI-USER TRANSMISSION

CROSS-REFERENCE TO RELATED APPLICATION

This application claims the benefit of U.S. Provisional Patent Application No. 62/175,991, filed Jun. 15, 2015, U.S. Provisional Patent Application No. 62/207,867, filed Aug. 20, 2015, and U.S. Provisional Patent Application No. 62/213,598, filed Sep. 2, 2015.

BACKGROUND

1. Technical Field

The technology described herein relates generally to wireless networking. More particularly, the technology relates to protecting communications in a wireless network using one or more of Multi-User (MU) Multi-Input-Multi-Output (MIMO) and MU Orthogonal Frequency Division Multiple Access (OFDMA) technologies.

2. Description of the Related Art

Wireless local area network (WLAN) devices are currently being deployed in diverse environments. Some of these environments have large numbers of access points (APs) and non-AP stations (STAs) in geographically limited areas. In addition, WLAN devices are increasingly required to support a variety of applications, such as video, cloud access, and offloading.

In particular, video traffic is expected to be the dominant type of traffic in many high efficiency WLAN deployments. With the real-time requirements of some of these applications, WLAN users demand improved performance in delivering their applications.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Orthogonal Frequency Division Multiple Access (OFDMA) can be used in wireless networks to enhance the aggregation into a single frame of multiple payloads that are destined to multiple stations. Accordingly, OFDMA technology is now being considered for next generation WLAN technologies, including the 802.11ax HE WLAN.

An HE WLAN supports Down-Link (DL) and Up-Link (UL) Multi-User (MU) transmissions such as OFDMA transmissions and MU Multi-Input-Multi-Output (MU MIMO) transmissions.

In an UL MU transmission, an AP may transmit a frame (such as a Trigger frame or another type of frame) to a plurality of stations requiring an immediate response from the plurality of stations. In response, the plurality of stations simultaneously transmit respective UL MU transmission frames to the AP.

However, while MU transmissions can increase efficiency in some situations, they generally require coordination between multiple transmitters. To coordinate, MU transmitters would benefit from information that is not conventionally available. In addition, MU capabilities present opportunities to consolidate transmissions and reduce system overhead.

Without proper protection, transmissions from multiple STAs could cause high levels of interference to one another. To protect one STA's transmission from other STAs, the IEEE 802.11 series of standards has adopted a Request-To-Send (RTS) and Clear-To-Send (CTS) frame exchange. However, as the IEEE 802.11 standard evolves to include multiple users' simultaneous transmission and reception scheduled within a Basic Service Set (BSS), conventional RTS/CTS frame exchange mechanisms cannot protect multiple STA's communications efficiently, especially for multiple cascaded MU transmissions.

There are several reasons why additional protections for MU transmissions beyond the protections provided in the IEEE 802.11ac standard are desirable. One reason is that the protections provided in 802.11ac were established for low density indoor environments, and not for higher density and outdoor environments. In addition, recent developments to wireless standards suggest that BSSs will be larger in the future, and therefore more difficult to protect.

Another reason is that previous standards do not support UL MU transmissions. For UL MU transmissions, more protection is desirable as the size of frames transmitted by STAs increase. In addition, the frequency of OFDMA/MU-MIMO transmissions may increase as technology evolves.

SUMMARY

In an embodiment, a method for protecting a shared wireless channel for use by an access point includes generating, by the access point, a control frame that is addressed to a plurality of wireless devices, wherein generating the control frame includes providing a group address in one or more fields of the control frame, and transmitting, by the access point, the control frame to the plurality of wireless devices, wherein the control frame solicits a Clear-to-Send frame from any wireless device in the plurality of wireless devices that satisfies a set of conditions, wherein each Clear-to-Send frame authorizes the access point to perform a downlink transmission on the shared wireless channel. The control frame may be a Request-to-Send (RTS) frame or a multi-user (MU) RTS frame.

In various embodiments, the group address may be provided in a Receiver Address field of the control frame or in one or more Association Identification fields located in a payload section of the control frame.

The access pointe may process a received Clear-to-Send frame, wherein the received Clear-to-Send frame is composed of one or more simultaneous transmissions of Clear-to-Send frames from one or more respective wireless devices in the plurality of wireless devices.

In an embodiment, each of the one or more simultaneously transmitted Clear-to-Send frames includes identical information such that the one or more simultaneously transmitted Clear-to-Send frames combine over-the-air to form the received Clear-to-Send frame.

Conditions of the set of conditions may include that a receiving device of the control frame is in the same Basic Service Set (BSS) as the access point, is that the receiving device of the control frame has buffered data to transmit to the access point, that the access point has buffered data to transmit to the receiving device of the control frame, and that a receiving device of the control frame is seeking a random access channel for an uplink transmission.

In an embodiment, a method for protecting a shared wireless channel for use by a wireless device includes analyzing, by the wireless device, a control frame from an access point, the control frame being addressed to a plurality of wireless devices, including the wireless device, by a group address in one or more fields of the control frame, wherein the control frame solicits a Clear-to-Send frame from any wireless device in the plurality of wireless devices that satisfies a set of conditions, wherein each Clear-to-Send frame authorizes the access point to perform a downlink transmission on the shared wireless channel, and transmitting, by the wireless device, a Clear-to-Send frame, wherein the Clear-to-Send frame is transmitted in response to matching the group address in the one or more fields with an address associated with the wireless device and satisfying the set of conditions. The control frame may be a Request-to-Send (RTS) frame or a multi-user (MU) RTS frame, and the group address may be provided in a Receiver Address field or one or more Association Identification fields located in a payload section of the control frame.

In an embodiment, the Clear-to-Send frame from the wireless device is simultaneously transmitted with Clear-to-Send frames from the plurality of wireless devices. Each of the one or more simultaneously transmitted Clear-to-Send frames, including the Clear-to-Send frame transmitted by the wireless device, may include identical information such that the one or more simultaneously transmitted Clear-to-Send frames combine over-the-air.

BRIEF DESCRIPTION OF THE DRAWINGS

FIG. 14 illustrates a process for protecting a shared wireless channel according to an embodiment.

FIG. 15 illustrates a process for protecting a shared wireless channel according to an embodiment.

DETAILED DESCRIPTION

Figure 1:
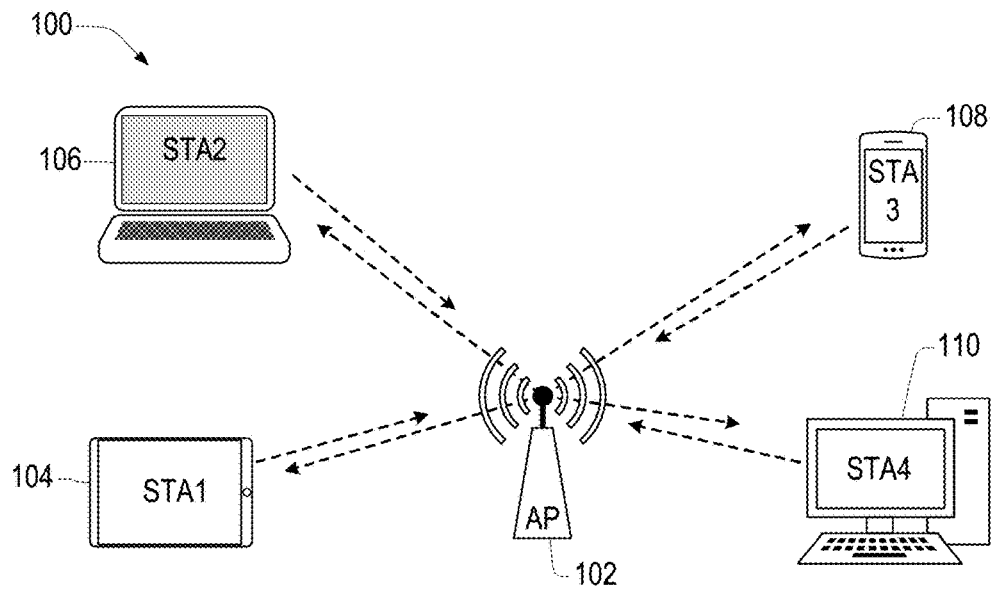
FIG. 1 illustrates a wireless network according to an embodiment.

The technology described herein relates generally to wireless networking. More particularly, the technology relates to simultaneous communications between stations, including Up-Link (UL) communications, in a wireless network using one or more of a Multi-User (MU) Multi-Input-Multi-Output (MIMO) technology and MU Orthogonal Frequency Division Multiple Access (OFDMA) technology.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast or multicast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

Figure 2:
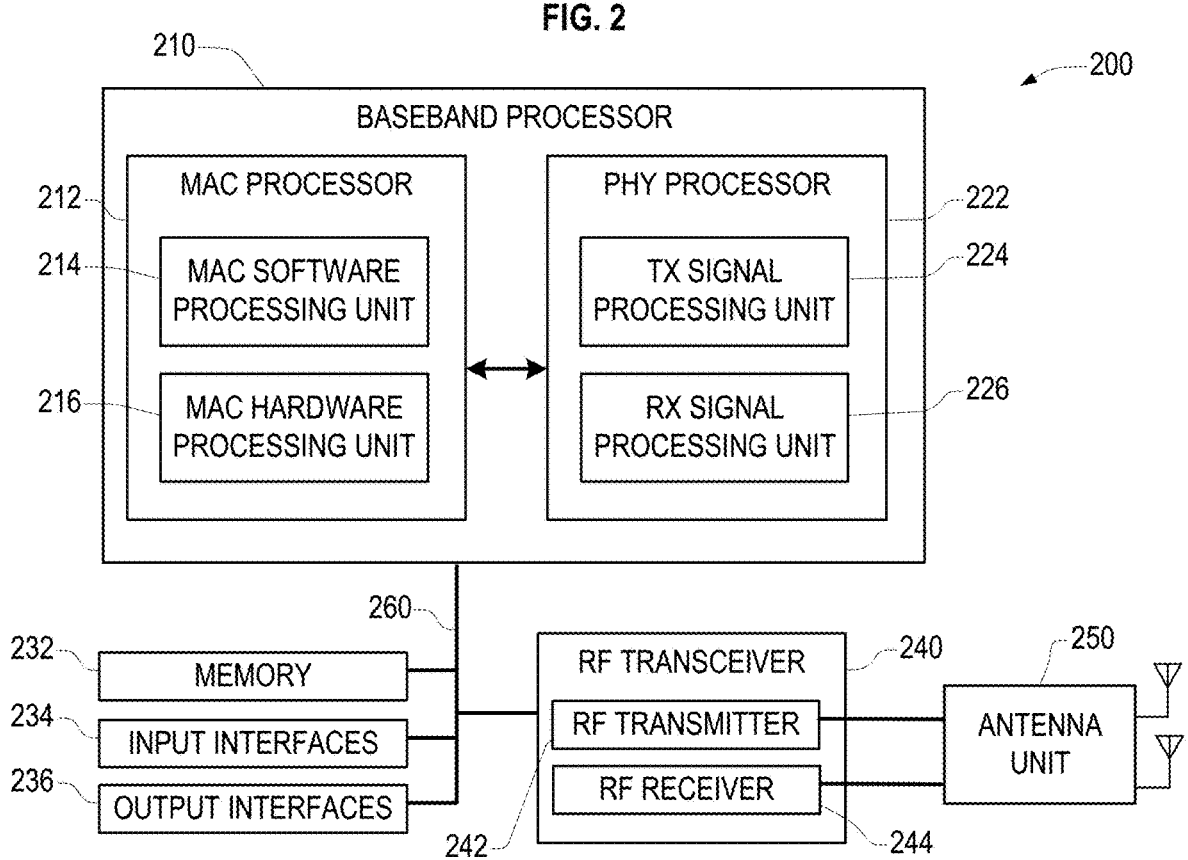
FIG. 2 is a schematic diagram of a wireless device according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
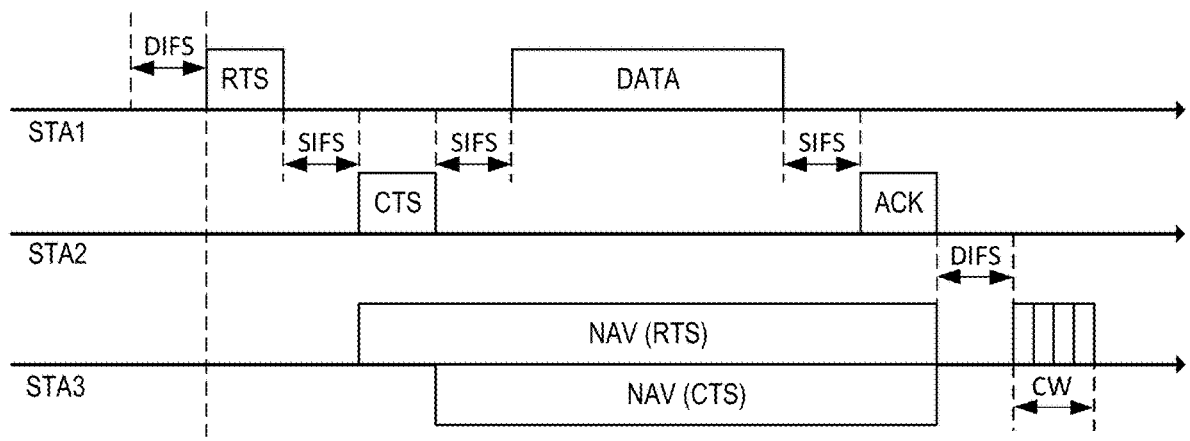
FIG. 3 illustrates CSMA/CA based frame transmissions in a wireless network according to an embodiment.

FIG. 3 illustrates a Carrier Sense Multiple Access/Collision Avoidance (CSMA/CA) based frame transmission procedure for avoiding collision between frames in a channel according to an embodiment. FIG. 3 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

This disclosure provides embodiments of a method and system for protecting wireless transmissions on a shared channel. More specifically, this disclosure provides embodiments of methods that protect frame transmissions to or from more than one associated STA that are initiated by a serving AP.

Throughout this disclosure, the term multi-user (MU) transmission refers to embodiments in which multiple frames are transmitted to or from multiple STAs simultaneously using different resources. Examples of different resources include frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions. In some embodiments, these types of MU transmissions may be combined into a single MU transmission.

Figure 4:
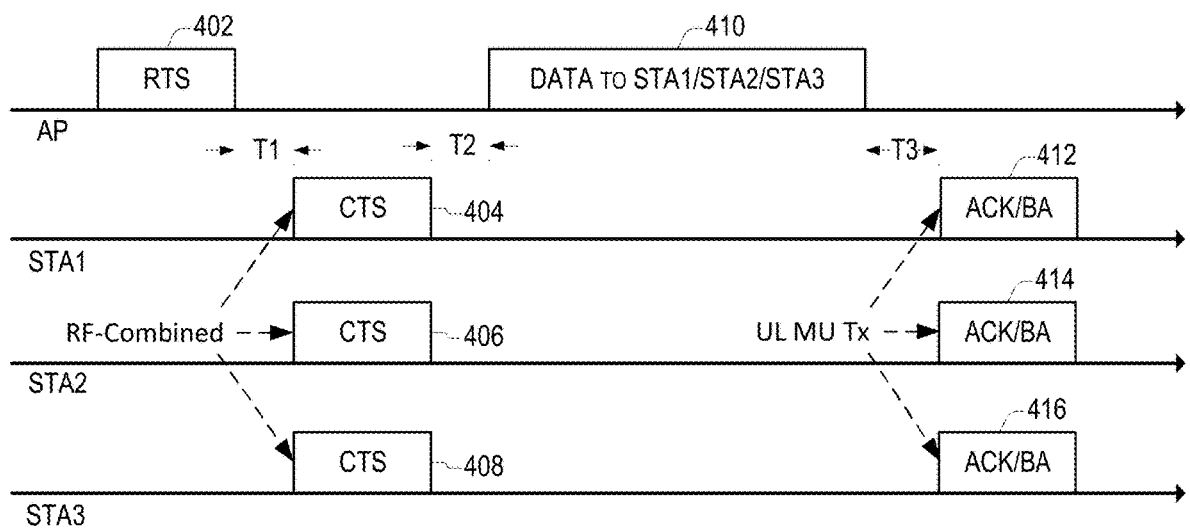
FIG. 4 illustrates MU UL transmissions in a wireless network according to an embodiment.

One protection mechanism for MU transmissions is RF-combined CTS transmissions. FIG. 4 illustrates an embodiment of RF-combined CTS transmissions.

In FIG. 4, an AP transmits DL data frames 410 to STA1, STA2 and STA3 simultaneously as DL MU transmissions, and receives UL acknowledgement frames 412, 414 and 416 from all three STAs simultaneously as UL MU transmissions.

In an embodiment, before the AP sends data frames 410 to these STAs, the AP first sends an RTS frame 402. The RTS frame 402 indicates that the three STAs shall send CTS frames, if the channel is idle from each STA's perspective. In other embodiments, other types of frames are used to indicate that the STAs shall send CTS frames, such as a multiuser RTS frame (MU-RTS), or a legacy frame (e.g., an RTS frame) with a group ID.

After receiving the RTS frame 402, the three STAs send CTS frames 404, 406 and 408 a predetermined time (T1) after receiving RTS frame 402 using identical information, such that all three CTS frames 404, 406 and 408 sent by different STAs can be RF-combined before the AP receives the frames, resulting in an increase in signal amplitude. In some embodiments, such as when the three STAs use the same frequency resources, the identical information is sent with identical waveforms.

After receiving the CTS frames 404, 406 and 408, the AP then transmits DL data frames 410 to all three STAs a predetermined time (T2) after receiving the CTS frames in the same multi-user (MU) transmission. The three STAs may send back acknowledgement frames 412, 414 and 416, which may be block acknowledgment (BA) frames, together as UL MU transmissions a predetermined time (T3) after receiving data frames 410. The predetermined times T1, T2 and T3 may be interframe spaces, such as Short Interframe Spaces (SIFS) and DCM Interframe Spaces (DIFS).

Even though allowing multiple STAs to send the same CTS frame simultaneously can reduce signaling overhead, there are several situations for which this protocol may not work efficiently. One example is illustrated by FIG. 5, which shows five STAs (STA1, STA2, STA3, STA4 and STA5) associated with an AP.

Figure 5:
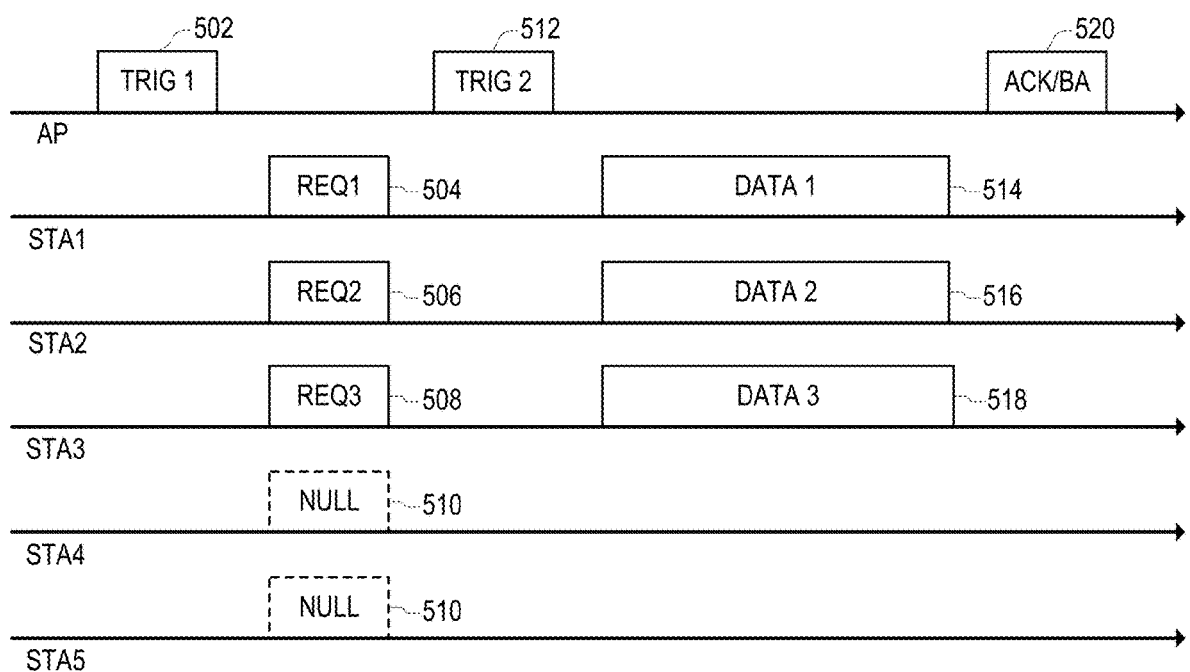
FIG. 5 illustrates MU UL transmissions in a wireless network according to an embodiment.

In the example of FIG. 5, the AP wishes to schedule an UL MU transmission. However, in order to schedule an optimal UL MU transmission, the AP uses information about whether each associated STA has buffered data for UL transmissions as well as related Quality of Service (QoS) parameters. Because the AP does not have prior information on the pending transmissions or QoS parameters, the AP sends a first Trigger frame 502 (TRIG1) to all the associated STAs. Trigger frame 502 solicits a frame from STA1-STA5 that includes information on each STA's UL buffer status and/or related QoS parameters. The QoS parameters may include, for example, Queue size and buffer state for each traffic ID (TID) or each access category. This information may be sent as an UL MU transmission.

In this example, STA1, STA2 and STA3 have buffered UL data frames to send and STA4 and STA5 do not have any frames to send. Therefore, STA1, STA2 and STA3 respond by sending back request frames 504 (REQ1), 506 (REQ2) and 508 (REQ3) that request UL MU transmissions. The request frames include UL buffer status and/or related QoS parameters. STA4 and STA5 do not have any pending data, so these STAs either do not send any frames, or send frames indicating that the STAs do not have any data to transmit in UL at this time (e.g., NULL frames 510) in response to the AP's first Trigger frame 502.

After receiving the request frames 504, 506 and 508, the AP schedules an UL MU transmission and sends a second Trigger frame 512 (TRIG2) to STA1, STA2 and STA3 for UL MU transmission of data frames. In response, STA1, STA2 and STA3 transmit data frames 514, 516 and 518, (DATA1, DATA2 and DATA3) respectively, to the AP. After receiving the data frames, the AP transmits acknowledgment frame 520 (ACK) to the STAs.

As shown in this example, even though only three STAs exchanged data with the AP, the AP initiated an UL request frame exchange with all associated STAs. In the situation shown in FIG. 5, there are challenges with respect to protecting the transmission of UL request frames 504, 506, 508 and 510 (REQ1, REQ2, REQ3, NULL4, NULL5) and for UL data frames 514, 516 and 518, because the STAs participating in these two events are different.

Figure 6:
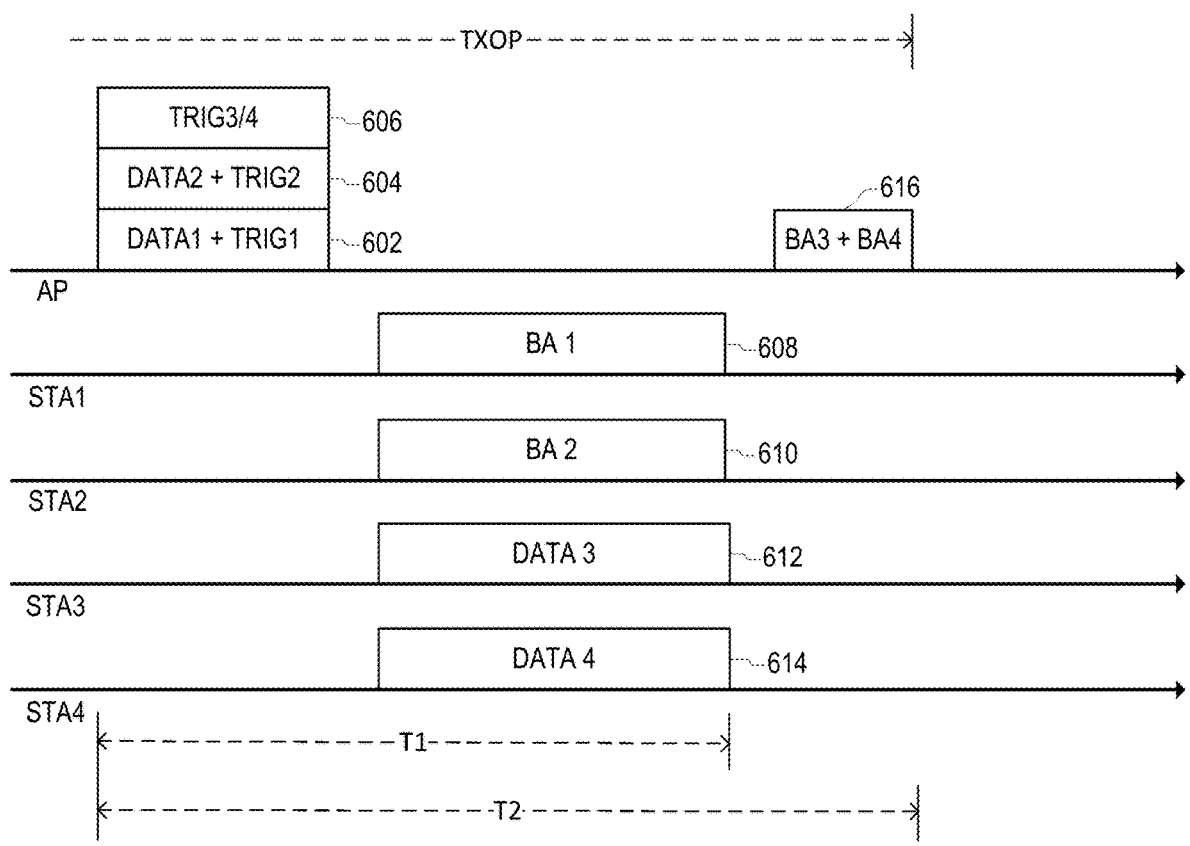
FIG. 6 illustrates MU UL and DL transmissions in a wireless network according to an embodiment.

FIG. 6 illustrates a second example of allowing multiple STAs to send the same CTS frame simultaneously. In FIG. 6, an AP schedules more than one frame exchange with different groups of STAs within a single TXOP. In particular, the AP first sends data DATA1 and DATA2 in data frames 504 and 506 to STA1 and STA2 as a DL MU transmission. When the AP transmits DL frames, the AP also schedules UL MU transmissions from STA3 and STA4 by broadcasting a single Trigger frame 502 (TRIG3 and TRIG4). Moreover, as the AP verifies successful reception of DL transmission at STA1 and STA2, the AP solicits acknowledgement frames from STA1 and STA2 by unicasting Trigger frames TRIG1 and TRIG2 together with data frames DATA1 and DATA2 in frames 602 and 604.

After the AP's MU transmission, STA1 transmits block acknowledgement frame 608 (BA1) and STA2 sends block acknowledgement frame 610 (BA2), while STA3 and STA4 send UL data frames 612 and 614 (DATA3 and DATA4) as UL MU transmissions. Finally, the AP transmits an acknowledgement frame 616 (BA3 and BA4) to STA3 and STA4.

As shown in FIG. 6, a time duration (T1) for the overall frame transmission sequence to STA1 and STA2 is different from the overall frame transmission sequence to STA3 and STA4 (T2). This situation presents challenges, because different participating STAs may require different protection times. If the protection time period is different for various STAs, then a protection time may extend for longer than necessary, or unprotected transmissions may occur.

In addition, even though allowing simultaneous CTS frame transmissions from multiple STAs can reduce signaling overhead, it may be difficult to apply appropriate protection when the STAs that require protection have not already been determined, or the particular STAs are changed during a protection period.

Figure 7:
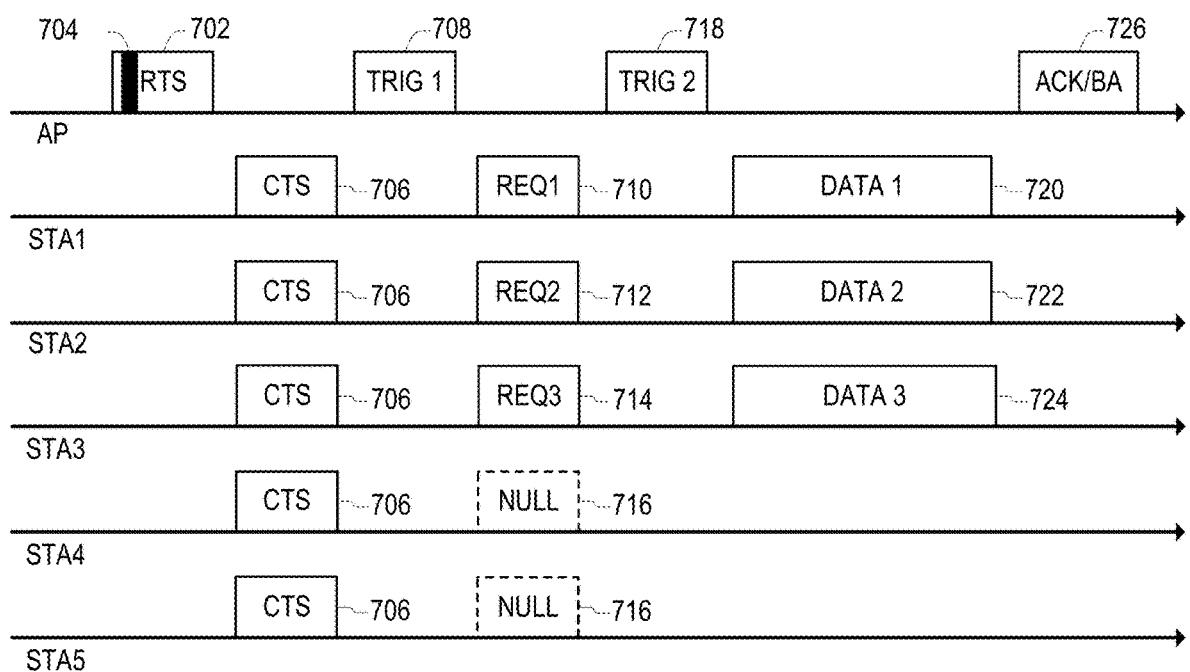
FIG. 7 illustrates MU UL transmissions according to an embodiment.

FIG. 7 shows an embodiment that addresses some of the issues discussed above. In the embodiment of FIG. 7, an AP may solicit RF-combined CTS frame transmissions from any STA that is associated with the AP. RF-combined CTS frames are frames which are aligned with other RF-combined frames in time, frequency and content, so that the aligned portions of the frames are spatially combined at the receiver. In an embodiment, the AP perceives RF-combined transmissions as a single transmission.

FIG. 7 shows five STAs (STA1, STA2, STA3, STA4, and STA5) that are associated with an AP that initiates a process of scheduling a UL MU transmission. In order to schedule accurate and efficient transmissions, the AP would benefit from information related to whether each associated STA has buffered data for UL transmissions, how much data the STAs have to transmit, and QoS parameters of the STAs. The QoS parameters may include, for example, Queue size and buffer state for each traffic ID (TID) or each Access category.

The AP initiates the scheduling process by transmitting a first frame 702 that includes a first field 704. In an embodiment, data field 704 indicates that target receivers of the first frame 702 are any STA that is associated with the AP, or any STA that is in the same BSS as the AP. Although FIG. 7 shows first frame 702 being an RTS frame, in other embodiments, first frame 702 may be another frame such as an MU-RTS frame. In various embodiments, the first field 704 may be a receiver address (RA) field or an Association Identifier (AID) field. When first field 704 indicates a plurality of STAs, first field 704 may be a group address, or field 704 may indicate multiple AIDs or MAC addresses.

In an embodiment, the first field or subfield 704 in frame 702 is a value that indicates that any STA associated with the BSS of the wireless device that transmits frame 702 is a target receiver. In an embodiment in which an AP sends a first frame 702 with target receiver information of the first field 704 set to "any STA within the BSS," any STA that is associated with the BSS and receives the RTS frame correctly sends a CTS frame 706 at the same time so that the CTS frames are RF-combined.

The data field 704 of the first frame 702 may comprise different information in various embodiments. For example, the first field 704 may include one or more of data indicating that a receiver address field is set to a broadcast address, and data indicating that an AID is used for indicating target receiver information in the payload of the first frame. In an embodiment, the first field 704 includes an AID value that indicates that any STA that is associated with the BSS of the transmitter of the first frame is an intended recipient of the frame. In other words, an AID value of first field 704 may indicate that the first frame 702 with the first field 704 is addressed to every STA that belongs to the same BSS as the transmitting AP. Thus, in an embodiment, the data field 704 may solicit responses from all STAs in a BSS.

In one embodiment, more than one AID can be included in the first frame 702, so that more than one associated STA is included in the first frame 702 (e.g., in the payload section of the first frame). In another embodiment, a single AID value of all zeroes indicates "any STA that is associated with the BSS of the transmitter of the first frame." In still another embodiment, a single AID value of all ones indicates "any STA that is associated with the BSS of the transmitter of the first frame." Thus, in some embodiments, multiple AID values may be present, where each AID value identifies a particular STA. In other embodiments, a single AID value is present, and that single AID value, instead of being a unique identifier of a specific STA, indicates all STAs associated with the BSS of the transmitter of the first frame 702.

After receiving frame 702 that includes the first field 704 which solicits a response from all associated STAs, all five STAs send the CTS frames 706 simultaneously in response to the first frame 702. The CTS frames 706 include the same information, but they may be transmitted using different bandwidths, which may be overlapping bandwidths.

In an embodiment, CTS frames 706 may be repeated in 20 MHz blocks of a channel such that a PPDU from a STA includes a CTS frame in each 20 MHz of the PPDU. For example, a first STA may transmit a PPDU with a 40 MHz bandwidth (e.g., one CTS frame in a first 20 MHz block of the PPDU and another CTS frame in a second 20 MHz block of the PPDU), while a second STA may transmit a PPDU with a 80 MHz bandwidth. (e.g., one CTS frame in the first 20 MHz block of the PPDU, one CTS frame in the second 20 MHz block of the PPDU, one CTS frame in a third 20 MHz block of the PPDU, and one CTS frame in a fourth 20 MHz block of the PPDU). In this example, the CTS frames from the first and second STAs in the first and second 20 MHz blocks are RF combined as they occupy the same respective frequency blocks and contain the same information (i.e., each of these overlapping CTS frames share the same waveforms in their respective frequency blocks). However, there is no RF combination in the third and fourth 20 Mhz blocks, as there was only one transmission in each of these blocks (i.e., only transmission of CTS frames from the second STA).

In the example provided above, the first and second STAs also may transmit a header that is repeated in the same fashion as the CTS frames in each 20 MHz block of the PPDUs. These headers contain the same information and therefore share the same waveforms in each respective frequency block. Based on the overlapping identical information/waveforms in each 20 MHz block of the PPDU, the AP perceives the PPDUs from the first and second STAs as a single 80 MHz PPDU. Although described as separate CTS frames in each PPDU for the sake of simplicity and clarity, each set of CTS frames in each PPDU may be considered a single CTS frame that has duplicated information in each 20 MHz block of the PPDU.

After receiving the CTS frames 706, the AP sends a first Trigger frame 708 (TRIG1) to all the associated STAs that solicits a frame that includes information on each STA's UL buffer status and/or related QoS parameters to be sent in an UL MU transmission. In the example of FIG. 7, only STA1, STA2 and STA3 have buffered UL data frames to send, while STA4 and STA5 do not have any buffered UL data.

Therefore, STA1, STA2 and STA3 transmit frames 710, 712 and 714 (REQ1, REQ2 and REQ3) that request UL MU transmissions. Frames 710, 712 and 714 include one or both of an UL buffer status and related QoS parameters for the transmitting STA. Meanwhile, STA4 and STA5 do not have UL data to transmit, so STA-4 and STA-5 transmit NULL frames 716 in response to the AP's first Trigger frame 708 or do not transmit any response to the Trigger frame 708.

After receiving the request frames 710, 712 and 714, the AP schedules UL MU transmissions and sends a second Trigger frame 718 (TRIG2) to STA1, STA2 and STA3 to trigger a UL MU data frame transmission. In response to receipt of the Trigger frame 718, STA1, STA2 and STA3 transmit data frames 720, 722, and 724 (DATA1, DATA2 and DATA3) respectively. The transmission of frames 720, 722, 724 may be performed in MU manner. For example, the transmission may utilize one or more of OFDMA and MU-MIMO techniques such that a single PPDU frame representing data frames 720, 722, and 724 is received and processed by the AP. The AP responds to the data frames with an acknowledgement frame 726 (ACK/BA), which may be a block acknowledgment frame, to the STAs.

Figure 8:
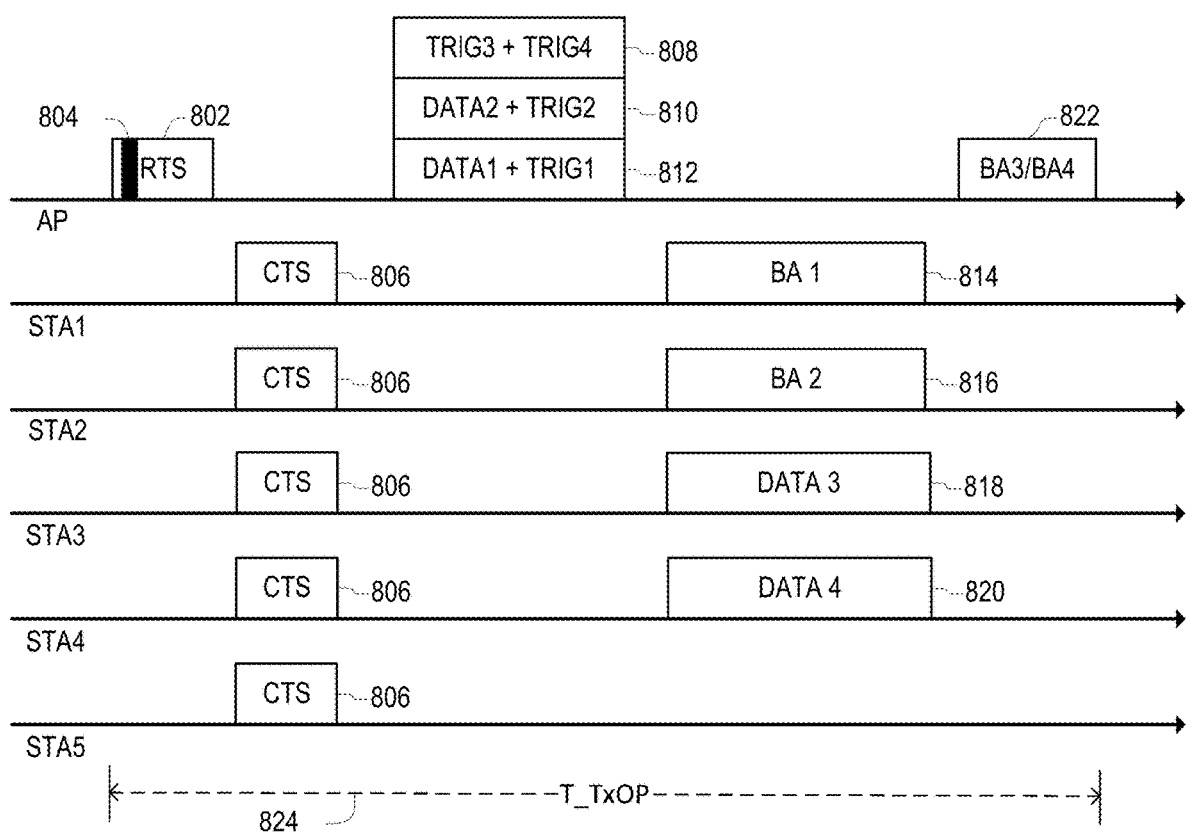
FIG. 8 illustrates MU UL and DL transmissions according to an embodiment.

FIG. 8 illustrates wireless transmissions according to an embodiment. FIG. 8 shows five STAs (STA1, STA2, STA3, STA4 and STA5) associated with an AP, and the AP schedules more than one frame exchange with different groups of STAs within a single transmission opportunity.

The AP initiates a TXOP 824 when it sends an RTS frame 802 that includes a data field 804 that sets target receivers of the RTS frame to be any STA that is associated with the AP. Therefore, all five STAs send the same CTS frame 806 simultaneously in response to the RTS frame 802.

Next, the AP sends data frames 810 and 812 (DATA1 and DATA2) to STA1 and STA2 as DL MU transmissions. When the AP transmits DL data frames 810 and 812, the AP also schedules UL MU transmissions from STA3 and STA4 by broadcasting a Trigger frame 808 (TRIG3+TRIG4). In this situation, the AP may be aware of UL data queued at that STAs from information received before the AP transmits the RTS frame, such as in a previous TXOP.

In order to verify that STA1 and STA2 successfully receive DL data transmissions of frames 810 and 812, the AP solicits acknowledgement frames from STA1 and STA2 by unicasting Trigger frames (TRIG1 and TRIG2) together with data frames (DATA1 and DATA2) to STA1 and STA2, respectively. After receiving frames 810 and 812 from the AP, STA1 and STA2 send acknowledgement frames 814 and 816 (BA1 and BA2), and STA3 and STA4 send UL data frames 818 and 820 (DATA3 and DATA4) as UL MU transmissions.

Finally, the AP transmits acknowledgement frame 822 (BA3/BA4) to STA3 and STA4. As shown in this figure, the TXOP 824 duration (T TXOP) for the full cascaded frame transmission sequence is set till the end of final frame exchange.

Other embodiments beyond the specific example explained above are within the scope of this disclosure. For example, in an embodiment, data field 804 is a subfield with a state that indicates that target receivers of a frame that solicits a CTS frame are any STA that is associated with the BSS of the transmitter of the frame that satisfies a first condition. In other words, when a wireless device transmits a frame that solicits a CTS frame, the wireless device may solicit CTS frames from every STA in the BSS that satisfies a first condition.

In an embodiment, the first condition does not imply a condition of wireless channel measurement, such as whether a wireless channel is busy or idle. Therefore, a wireless channel measurement condition such as CCA or NAV may be an additional condition to be satisfied before a STA transmits a CTS frame 806.

The precise nature of the first condition may be different in various embodiments. In one embodiment, the first condition is that the STA has buffered frames to send. In another embodiment, the first condition is that the AP has buffered frames for the STA. In still another embodiment, the first condition is a condition that either the STA has buffered frames to send to the AP or the AP has buffered frames for the STA.

In an embodiment, the first condition is that the STA is seeking to participate in UL MU transmissions using a random access channel. In an embodiment, the AP may schedule specific STAs for CTS transmission in RTS frame 802 that are known to the AP to have buffered DL data. In addition, the RTS frame 802 may indicate that the AP will support a random access channel during the TXOP so that any STA may access the random access channel during the TXOP. When a STA participates in random access or is seeking to utilize the random access channel, it satisfies the first condition. A random access channel is a channel that does not uniquely identify scheduled STA, so that STA can communicate in the random access channel without being scheduled to do so by an AP.

In another embodiment, the AP further transmits first information regarding STAs to which the AP has buffered frames to send. The first information may be transmitted together with or before sending a frame that solicits a CTS frame. In an embodiment, the first information is a Traffic Indication Map (TIM) as defined by the IEEE 802.11-1999 standard.

In another embodiment, an AP sends a Trigger frame for an UL MU transmission, and the Trigger frame comprises a first field indicating that any STA is allowed to participate in UL MU transmissions, and those participating STAs shall send a CTS frame before transmitting UL MU frames.

In another embodiment, the scheduling information for any participating STA is set using a predetermined rule. In one embodiment, the predetermined rule is to use a random access channel, so that STA participating in the TXOP use the random access channel.

In another embodiment, participating STAs that participate in transmissions in response to the frame soliciting the CTS frame are restricted to STAs that are associated with the AP. In particular, the participating STAs may be limited to STAs in the same BSS as the AP.

Figure 9:
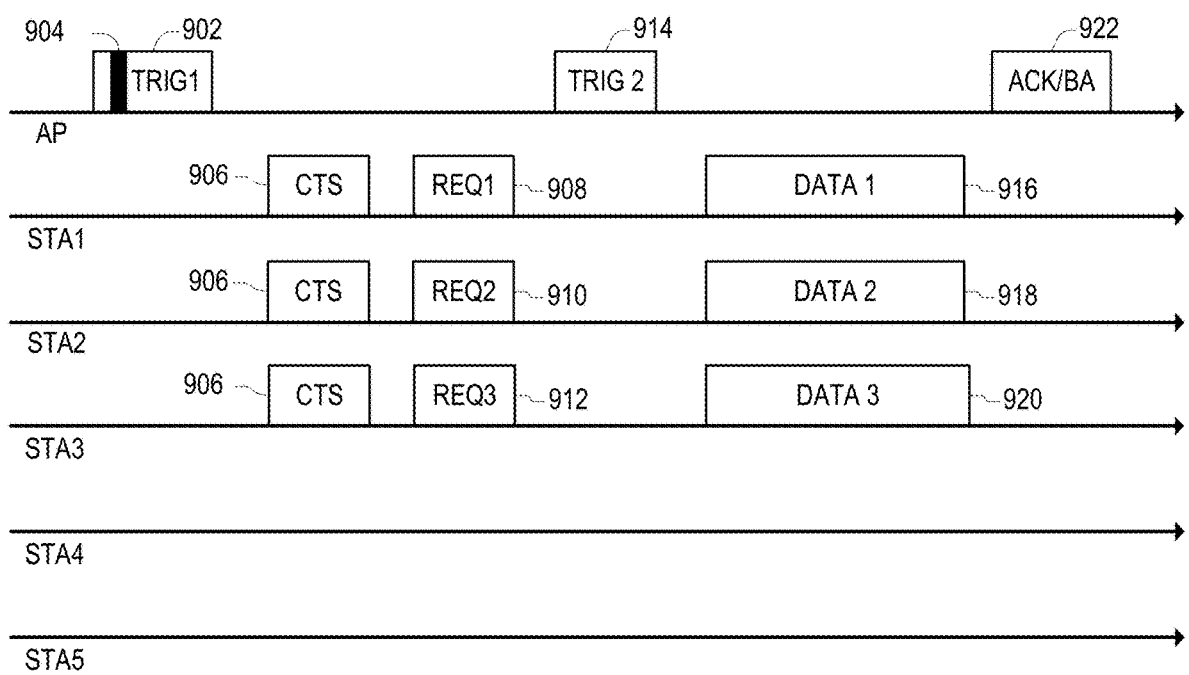
FIG. 9 illustrates MU UL transmissions according to an embodiment.

FIG. 9 illustrates an embodiment of the present disclosure. In FIG. 9, there are five STAs (STA1, STA2, STA3, STA4 and STA5) associated with an AP, and the AP schedules UL MU transmissions. However, to accurately schedule UL MU transmissions, the AP benefits from knowing if each associated STA has buffered data for UL transmissions as well as the STA's related QoS parameters.

A TXOP is initiated when an AP sends a Trigger frame 902 (TRIG1) that includes data 904 that sets the target receiver of the Trigger frame to be any STA that is associated with the AP and has buffered UL data to send. In other words, the trigger frame 902 that includes data 904 solicits responses from every STA in the AP's BSS with buffered UL data.

In the example of FIG. 9, only STA1, STA2 and STA3 have buffered UL data frames to send, and STA4 and STA5 do not have buffered UL data to send. Therefore, STA1, STA2 and STA3 simultaneously transmit CTS frames 906 to the AP so that the CTS frames are RF-combined.

In addition, the three STAs transmit request frames 908, 910 and 912 (REQ1, REQ2 and REQ3) that request UL MU transmissions and include UL buffer status information and/or related QoS parameters for the transmitting STAs. STA4 and STA5 do not transmit any frames in response to the AP's first Trigger frame 902.

After receiving the request frames 908, 910 and 912, the AP schedules UL MU data transmissions and transmits a second Trigger frame 914 (TRIG2) to STA1, STA2 and STA3 to trigger UL data transmissions from those STAs. STA1, STA2 and STA3 respond by transmitting UL data frames 916, 918 and 920 (DATA1, DTATA2, and DATA3) to the AP. The AP responds to the UL data frames by transmitting an acknowledgement frame 922 (ACK/BA), which may be a block acknowledgment frame.

Figure 10:
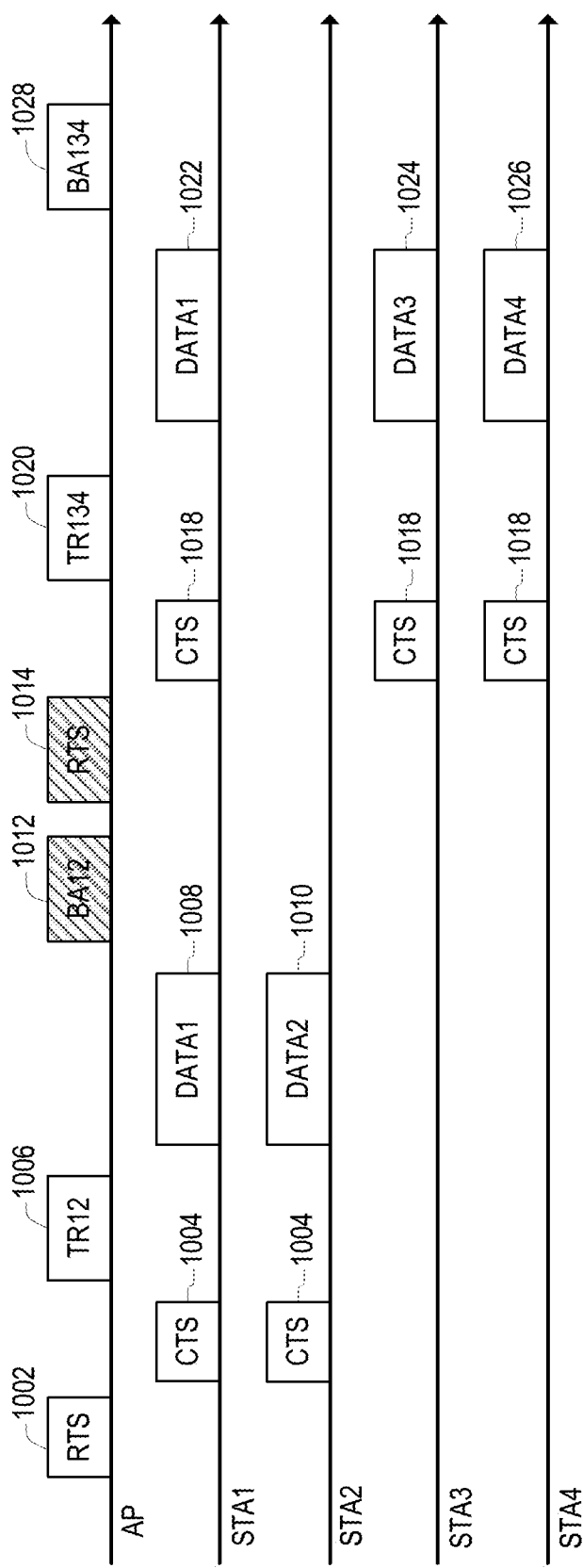
FIG. 10 illustrates MU UL transmissions in a wireless network according to an embodiment.

FIG. 10 illustrates separate UL MU data transmissions from a plurality of STAs to an AP. In FIG. 10, there are four STAs (STA1, STA2, STA3 and STA4) associated with an AP, and the AP tries to schedule UL MU transmissions from these four STAs. Due to limits to the duration of each OFDMA transmission, the AP schedules two consecutive UL MU transmissions from STA1. The first transmission is scheduled from STA1 and STA2, and the second transmission is scheduled from STA1, STA3 and STA4.

In a conventional process, the AP first sends an RTS frame 1002 that solicits CTS frames 1004 from STA1 and STA2. The CTS frames 1004 transmitted by STA1 and STA2 are RF-combined transmissions.

After receiving the CTS frame 1004, the AP sends a first Trigger frame 1006 (TR12) that schedules UL MU transmissions from STA1 and STA2. STA1 and STA2 send UL data frames 1008 and 1010 (DATA1 and DATA2) according to the scheduling information in the first Trigger frame 1006.

After receiving the data frames 1008 and 1010, the AP sends acknowledgement frame 1012 (BA12) to STA1 and STA2, and the AP schedules a second set of UL MU transmissions from STA1, STA3, and STA4.

In order to schedule these transmissions, the AP sends an RTS frame 1014, receives RF-combined CTS frames 1018, sends a second Trigger frame 1020 (TR134), and then receives UL data frames 1022, 1024 and 1026 (DATA1, DATA3 and DATA 4) at the scheduled resource from STA1, STA3, and STA4. Finally, the AP sends acknowledgements 1028 (BA134) to STA1, STA3 and STA4.

In the example of FIG. 10, two UL MU data transmissions are completely separated. In a conventional system, from the AP's point of view, block acknowledgment 1012 and the second RTS frame 1014 cannot be combined, and must be separately transmitted in sequential transmissions, which increases the overall duration required for the transmissions.

Embodiments of this disclosure overcome shortcomings of the example of FIG. 10. In an embodiment, an AP sends a DL MU RTS frame, and may send more than one RTS frame simultaneously. In an embodiment, a plurality of RTS frames are sent simultaneously, the RTS frames solicit RF-combined CTS frames from a plurality of STAs, and the solicited CTS frames have the same information and use the same MCS level.

Figure 11:
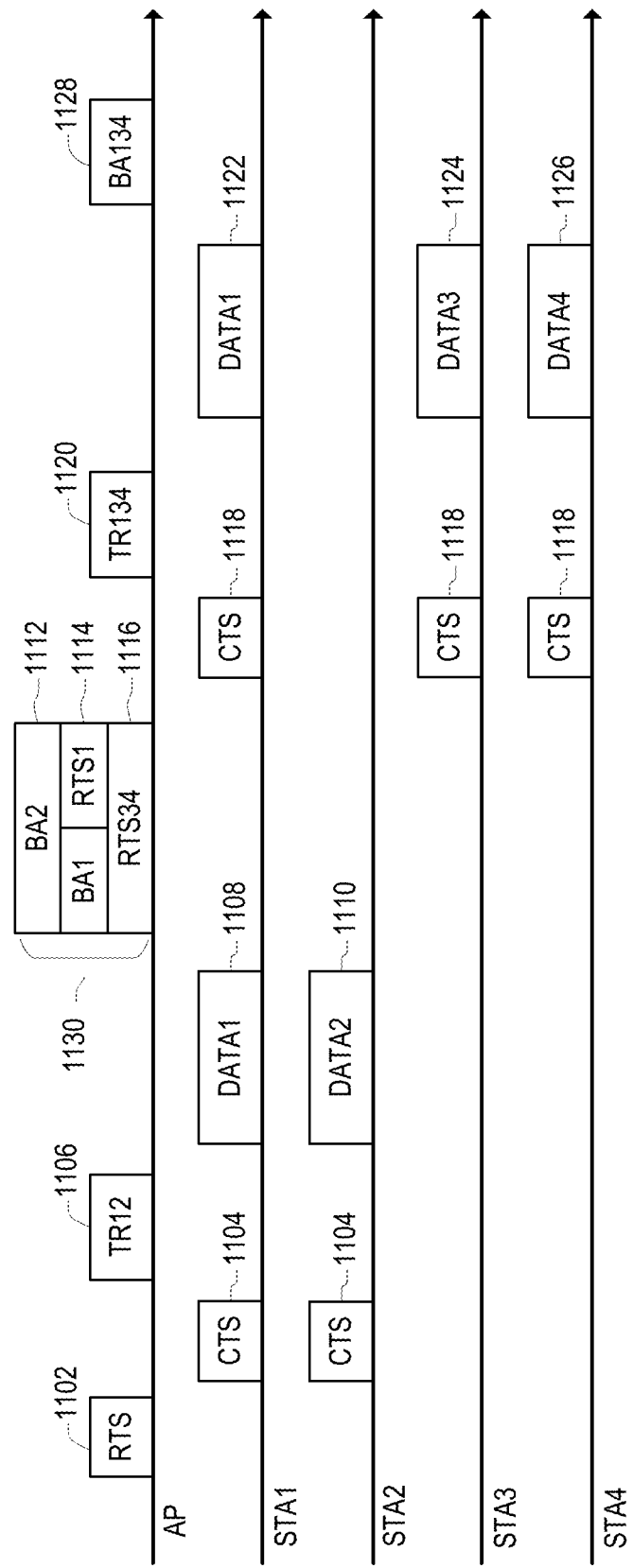
FIG. 11 illustrates MU UL and DL transmissions according to an embodiment.

FIG. 11 shows an embodiment that overcomes issues with the example of FIG. 10. In FIG. 11, the AP first sends an RTS frame 1102 that solicits CTS frames 1104 from STA1 and STA2. The CTS frames 1104 transmitted by STA1 and STA2 are RF-combined. After receiving the CTS frames 1104, the AP sends a first Trigger frame 1106 (TR12) that schedules UL MU transmissions from STA1 and STA2.

STA1 and STA2 transmit UL data frames 1108 and 1110 (DATA1 and DATA2) according to scheduling information in the first Trigger frame 1106.

After receiving the data frames 1108 and 1110, there are two pending actions for the AP. One is to transmit acknowledgement frames to STA1 and STA2, and the other is to send RTS frames to STA1, STA3, and STA4.

For this purpose, the AP simultaneously transmits a group of DL MU frames 1130 that include three simultaneously transmitted frames. The first frame is an acknowledgement frame 1112 (BA2) that acknowledges the UL transmission 1110 from STA2. Frame 1112 is a unicast frame whose target receiver is STA2.

The second frame is a frame 1114 that comprises an acknowledgment frame (BA1) that acknowledges the UL data frame 1108 from STA1. The second frame 1114 is unicast to STA1, and includes an RTS frame that solicits a CTS frame 1118 from STA1 that will be RF-combined with other CTS frames.

The third frame is a multicast/broadcast RTS frame 1116 (RTS34) whose target receivers include STA3 and STA4. RTS frame 1116 frame solicits RF-combined CTS frames from the target receivers. In an embodiment, only one STA may have buffered data to transmit to the AP, so RTS frame 1116 may solicit a single CTS frame 1118 from a single STA.

After receiving RF-combined CTS frames 1118, the AP sends a second Trigger frame 1120 (TR134), and receives UL data frames 1122, 1124 and 1126 (DATA1, DATA3 and DATA4) from STA1, STA3 and STA4. Finally, the AP sends acknowledgement frame 1128 (BA134) to STA1, STA3 and STA4.

Persons of skill in the art will understand that multiple embodiments of the concepts shown in FIG. 11 are possible. For example, the number and characteristics of the frames that are simultaneously transmitted to solicit CTS frames 1118 may vary. In an embodiment, the simultaneously transmitted frames 1130 include more than one unicast frame that solicits RF-combined CTS frames 1118 as immediate response frames from the target receivers. The simultaneously transmitted frames 1130 may be MU transmissions.

In an embodiment, the AP simultaneously transmits at least one unicast frame and a multicast or broadcast frame that solicit RF-combined CTS frames 1118 as an immediate response. Such an embodiment is described in the explanation of FIG. 11 above, which describes simultaneous frames 1130 as including unicast frame 1114 (RTS1) and multicast frames 1116 (RTS34) that solicit CTS frames 1118 as an immediate response. In another embodiment, the simultaneously transmitted frames 1130 include more than one multicast or broadcast frame that solicit RF-combined CTS frames 1118 as a response. Accordingly, various combinations of unicast, multicast and broadcast frames that solicit an immediate response of CTS frames 1118, are simultaneously transmitted as MU frames to a plurality of receivers.

In an embodiment, when DL MU frames that solicit RF-combined CTS frames 1118 as immediate response frames are transmitted simultaneously, the solicited CTS frames all have the same payload information and use the same modulation and encoding scheme so that the CTS frames are additively, or constructively, RF-combined. In an embodiment, the RF-combined CTS frames all use the same scrambler seed that is used in the RTS frame 1102 that solicited the RF-combined CTS frames 1104. All PPDU of the RTS frame 1102 may use the same scrambler seed. In an embodiment, all RTS frames 1130 that are simultaneously transmitted by the AP to solicit CTS frames 1118 solicit CTS frames that all use the same MCS level. In an embodiment, the term "MCS level" refers to an MCS index that is associated with a particular type of modulation, coding rate, and data rate.

In an embodiment, the AP may use the same scrambler seed for all PPDUs of parts of a frame that are a MU RTS frame. Thus, when other frames are transmitted by the AP in a consecutive set of transmissions or in simultaneous transmissions, at least the elements of the transmission that solicit CTS frames from multiple receivers use the same scrambling seed.

When the AP transmits a plurality of simultaneous frames and a first portion of the frames are RTS frames soliciting MU CTS frames, then all of the RTS frames in the first portion may use the same scrambler seed, while one or more different seed can be used for the non-RTS simultaneous DL transmissions. The RF-combined CTS response frames 1118 may use the same scrambling seed as the RTS frames of frames 1130.

In an embodiment, when the AP transmits more than one MU DL frame simultaneously, all of the simultaneous frames use the same scrambler seed even when they are not RTS frames.

The scrambler seed used by the AP for the one or more simultaneous RTS frames may be a predetermined scrambler seed for all PPDUs of the RTS frames. For example, the predetermined scrambler seed may be a seed previously stored in a system memory, or it may be generated using a predetermined process. When an AP transmits a plurality of frames that include such RTS frames as well as non-RTS frames, the non-RTS frames may use a different scrambling seed from the predetermined scrambling seed. A plurality of CTS frames sent in response to the RTS frames may use the same predetermined scrambler seed as the RTS frames. In an embodiment, when an AP transmits a plurality of MU frames simultaneously, all simultaneously transmitted frames use the predetermined scrambler seed.

In another embodiment, the scrambler seed to be used for simultaneously transmitted RF-combined CTS frames is communicated to the STA in frames that are transmitted outside of an RTS-CTS exchange. For example, the specific scrambler seed can be communicated on a periodic basis using frames such as Beacon frames.

In other embodiments, the scrambler seed to be used for RF-combined CTS frames is communicated to a STA when the STA associates with the AP. For example, the scrambler seed may be transmitted to an associating STA in a Probe Response frame or a (Re)Association Response frame. In another embodiment, the scrambling seed is communicated to STAs in a frame that solicits the RF-combined CTS frame.

It is not necessary for the scrambler seed of the simultaneous RF-combined CTS frames to be the same scrambler seed used to transmit RTS frames. For example, in an embodiment, the scrambler seed used for simultaneous RF-combined CTS frames is a predetermined scrambler seed that is used for all such transmissions regardless of scrambler seeds used for RTS frames. In such an embodiment, it is not necessary to provide the wireless devices transmitting the RF-combined CTS frames with the scrambler seed.

As discussed above, all of the RF-combined CTS frames 1118 are transmitted using the same MCS level. In order to accomplish this, each STA should have an indication of which MCS level to use prior to transmitting the RF-combined CTS frames. This can be implemented in several different ways.

For example, in one embodiment, the AP uses the same MCS level as the CTS frames it solicits. In such an embodiment, the AP may use the same MCS level for all PPDUS that include the RTS frames of simultaneously transmitted frames 1130. The transmission rate of the RF-combined CTS frames 1118 may be the primary rate based on the rate or MCS of the frames that solicit the CTS frames. Here, the primary rate is the primary rate as defined by the IEEE 802.11 standard. Therefore, the CTS frames may transmit at a rate that is based on the frame rate of the soliciting frames.

In another embodiment, the STAs transmit at a predetermined MCS level regardless of the MCS level of the AP's frames. In such an embodiment, the MCS level used by the STAs may be the primary rate. In another embodiment, the predetermined MCS level is the minimum possible MCS level. In another embodiment, when the AP simultaneously transmits a plurality of frames 1130 that include at least one RTS frame, all frames that comprise an RTS frame use the lowest MCS level.

In another embodiment, an MCS level to be used for RF-combined CTS frames 1118 is communicated to the STA in a frame. The MCS level may be communicated periodically using Beacon frames. In another embodiment, the specific MCS level to be used for RF-combined simultaneous CTS frames 1118 is indicated when a STA associates to the AP, for example using a Probe Response frame or Reassociation Response frame. In another embodiment, the specific MCS level to be used for RF-combined simultaneous CTS frames 1118 is indicated in a frame that solicits the RF-combined simultaneous CTS frames, such as an RTS frame.

In another embodiment, when a DL MU PPDU comprises a broadcast frame, which can be identified in SIG-B field, the MCS of the RF-combined simultaneous CTS frames 1118 uses the primary rate based on the MCS of the broadcast frame within the DL MU PPDU.

If the DL MU PPDU does not comprise a broadcast frame, all frames within the DL MU PPDU that include an RTS frame may use the MCS level that generates the same primary rate. In an embodiment, if a DL MU PPDU comprises a plurality of broadcast frames, all broadcast frames use the same MCS level.

In another embodiment, the AP uses an MCS level that results in the same priority rate for the PPDUs that include simultaneously transmitted MU RTS frames. In such an embodiment, other parts of the PPDU may use a different MCS level from the portion of the PPDU that includes the RTS frames.

In another embodiment, the MCS level of the RF-combined simultaneous CTS frames is the primary rate based on the lowest MCS level among DL frames within the DL MU PPDU.

In view of the foregoing description, persons of skill in the art will recognize that numerous specific embodiments are possible.

In one embodiment, a method of protecting wireless transmissions from a STA in a wireless communication system includes transmitting a plurality of first DL MU frames, wherein the first frames solicit CTS frames and the scrambler seed of the first group of the first frames is the same, and receiving RF-combined CTS frames from at least one STA. In this embodiment, the scrambler seed of the RF-combined CTS frame is the same with that of the first group of the first frames. The scrambler seed of the first frames may be predetermined. The scrambler seed may be the same for all of the first frames.

In another embodiment, a method of protecting wireless transmissions from a STA in a wireless communication system includes transmitting a plurality of DL MU first frames, wherein a first group of the first frames solicits a CTS frame and the first group of the first frames comprises information on the scrambler seed to be used for the CTS frame, and receiving RF-combined CTS frames from a plurality of STAs. In this embodiment, the scrambler seed of the RF-combined CTS frames may be calculated based on the information on the first group of the first frames.

In another embodiment, a method of protecting wireless transmissions from a STA in a wireless communication system includes transmitting a second frame that includes information about a scrambler seed for RF-combined CTS frames, transmitting a plurality of DL MU first frames that solicit the RF-combined CTS frames, and receiving RF-combined CTS frames from STAs. In this embodiment, the scrambler seed of the RF-combined CTS frame is calculated based on the information on the second frame. The second frame may be a Beacon frame, a Probe Response frame, an Association Response frame, or a Reassociation Response frame.

In another embodiment, a method of protecting wireless transmissions from a STA in a wireless communication system includes simultaneously transmitting a plurality of DL MU first frames, wherein a first group of the first frames solicits CTS frames and the MCS level of the first group of the first frames is the same, and receiving RF-combined CTS frames from STAs. In this embodiment, the MCS level of the RF-combined CTS frames may be based on the MCS level of the first group of the first frames. In an embodiment, the MCS level of the first group of the first frames is predetermined. In an embodiment, the MCS level of the first group of the first frames is the lowest MCS level supported by all of the STAs.

In another embodiment, a method of protecting wireless transmissions from a STA in a wireless communication system includes transmitting a plurality of DL MU first frames, wherein a first group of the first frames solicits a CTS frame and the first group of the first frames include information on a MCS level to be used for the CTS frame, and receiving at least one CTS frame from one or more STAs, wherein the MCS level of the at least one CTS frame is determined using the information on the first group of the first frames.

In another embodiment, a method of protecting wireless transmissions from a STA in a wireless communication system includes transmitting a second frame, wherein the second frame comprises information about a MCS level to be used for RF-combined CTS frames, transmitting a plurality of DL MU first frames, wherein a first group of the first frames solicits the RF-combined CTS frames, and receiving RF-combined CTS frames from STAs. In this embodiment, the MCS level of the RF-combined CTS frames is calculated based on the information in the second frame. The second frame may be a Beacon frame, a Probe Response frame, an Association Response frame, or a Reassociation Response frame.

In another embodiment, a method of protecting wireless transmissions from a STA in a wireless communication system includes transmitting a plurality of first DL MU frames, wherein a first group of the first frames solicits a CTS frame and primary rate for MCS levels of the first group of the first frames is the same, and receiving RF-combined CTS frames from STAs, wherein the MCS level of the RF-combined CTS frames is the primary rate based on the MCS level of the frame that triggers the CTS frame.

In another embodiment, a method of protecting wireless transmissions from a STA in a wireless communication system includes transmitting a plurality of DL MU first frames, wherein a first group of the first frames solicits CTS frames, and receiving RF-combined CTS frames from STAs, wherein the MCS level of the RF-combined CTS frame is the primary rate based on the lowest MCS level among the first frames.

In another embodiment, a method of protecting wireless transmissions from a STA in a wireless communication system includes transmitting a plurality of first DL MU frames, wherein the first group of the first frames solicits a CTS frame, and wherein, when the first frames include one or more broadcast frame, every broadcast frame uses a first MCS level. When the first frames do not include any broadcast frames, the MCS level of the first group of the first frames are set such that the primary rate for MCS levels of the first group of the first frames is the same. This embodiment includes receiving RF-combined CTS frames from STAs, wherein, when the first frames include a broadcast frame, the MCS level of the RF-combined CTS frames is the primary rate based on the first MCS level, and when the first frames do not include any broadcast frames, the MCS level of the RF-combined CTS frame is the primary rate based on the MCS level of the frame that triggers the CTS frame.

Even though RF-combined CTS frames can reduce overhead for protection, there are disadvantages associated with RF-combined CTS frames. For CTS frames sent by multiple STAs to be RF-combined, every participating STA uses the same information—if different information is used, attenuation may occur. This constraint limits the nature of the RF-combined CTS frames. In particular, RF-combined frames should have the same scrambling sequence and the same Frame Control field, Duration field, and RA field.

Using identical information for the CTS frames implies that information specific to each STA cannot be delivered using such frames. One key STA-specific piece of information that is in this category is the available channel bandwidth of the CTS frames, which is referred to as dynamic bandwidth signaling. In general, the results of channel assessments performed by individual STAs fall into the category of STA-specific information that is incompatible with RF-combined CTS frames. Without available channel bandwidth information, it is possible that a serving AP may schedule and allocate MU transmission resources on channels that are not clear for the STAs.

Accordingly, in an embodiment of this disclosure, every STA that transmits a CTS frame of RF-combined CTS frames includes information indicating the transmission bandwidth of an RTS frame that solicited the RF-combined CTS frames, and transmits the CTS frame using channel bandwidth that CCA indicates as being idle within the transmission bandwidth of the received RTS frame. In other words, in an embodiment, the channel bandwidth of the CTS frames is limited to the possible channel bandwidth indicated by an RTS frame. The channel bandwidth of the CTS fame may be a portion of the full bandwidth indicated in the RTS frame. In an embodiment, the channel bandwidth used to transmit a CTS frame indicates that the channel bandwidth is clear for the STA transmitting the CTS frame, so that a clear channel can be indicated to the AP without including a STA-specific CCA result in the CTS frame.

One example of implementing the proposed idea is to adopt a particular mode of operation for transmitting RF-combined CTS frames, wherein a CTS frame is sent in non-HT duplicate format with its SERVICE field set to the transmission bandwidth of the received RTS frame. In this example, the transmission bandwidth of the CTS frame is set to a channel width for which CCA on all secondary channels has been idle and that is within the transmission bandwidth of the received RTS frame. In this example, after receiving CTS frames from multiple STAs, an AP can at least avoid scheduling transmissions on bandwidths that no STA used to transmit a CTS frame.

Figure 12:
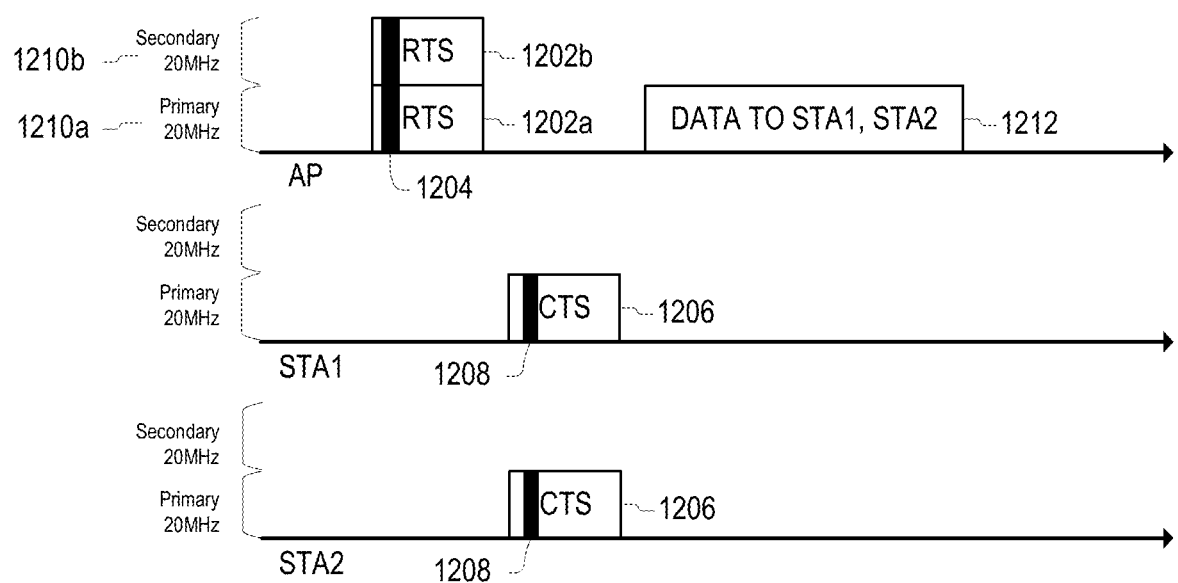
FIG. 12 illustrates MU transmissions in multiple channels according to an embodiment.

FIG. 12 illustrates an embodiment of an exchange of frames between an AP and STAs in which CTS frames simultaneously transmitted by the STAs do not include CCA results that are specific to the particular STAs. In FIG. 12, an AP sends an RTS frame 1202 to two STAs (STA1 and STA2) using a bandwidth of 40 MHz, which includes primary 20 MHz band 1210a and secondary 20 MHz band 1210b. The RTS frame 1202 is duplicated in each 20 MHz of the transmission bandwidth, so that a first RTS frame 1202a is transmitted in primary channel 1210a and a second RTS frame 1202b is transmitted in secondary channel 1210b.

The RTS frames 1210a and 1210b include first information 1204. In an embodiment, the first information 1204 indicates that that both STA1 and STA2 are supposed to transmit respective CTS frames, and a transmission bandwidth of the RTS frame is 40 MHz. Immediately before STA1 and STA2 receive RTS frame 1202, the wireless medium for STA1 was idle for only the primary 20 MHz band, and the wireless medium for STA2 was also idle for primary 20 MHz band.

Subsequently, STA1 and STA2 transmit CTS frames 1206 that include second information 1208. The second information 1208 in the CTS frames 1206 sent from STA1 and STA2 is identical, and in an embodiment, second information 1208 is the transmission bandwidth of the received RTS frame 1202, which is obtained from first information 1204 of the received RTS frame 1202. However, the transmission bandwidth of the CTS frame 1206 from STA1 and STA2 is the primary 20 MHz 1210a because the only portion of the 40 MHz occupied by RTS frames 1202 that was idle for both STA1 and STA2 was the primary 20 MHz 1210a.

In this example, after transmitting RTS frames 1210 using 40 MHz of bandwidth, the AP receives RF-combined CTS frames 1206 from STA1 and STA2 in the primary 20 MHz band 1210a. Therefore, the AP transmits data frames using only the primary 20 MHz band 1210a, and STA1 and STA2 avoid using the secondary 20 MHz band 1210b.

In an embodiment, a HE STA that is addressed by an RTS frame in a non-HT or duplicate non-HT PPDU that has a bandwidth signaling Transmit Address (TA), and that has the RXVECTOR parameter DYN_BANDWIDTH_IN_NON_HT equal to Dynamic, and in which the Return Address (RA) indicates more than one STAs, behaves in the following manner. If the NAV indicates idle, then the STA shall respond with a CTS frame 1206 in a non-HT or non-HT duplicate PPDU after a SIFS period. In such an embodiment, the CTS frame's TXVECTOR parameter CH_BANDWIDTH shall be set to any channel width for which CCA on all secondary channels has been idle for a PIFS prior to the start of the RTS frame and that is less than or equal to the channel width indicated in the RTS frame's RXVECTOR parameter CH_BANDWIDTH_IN_NON_HT, and the CTS frame's TXVECTOR parameter CH_BANDWIDTH_IN_NON_HT shall be set to the same value as the RTS frame's RXVECTOR parameter CH_BANDWIDTH_IN_NON_HT. Otherwise, the STA shall not respond with a CTS frame 1206.

In another embodiment, RTS frame 1202 includes first information 1204 that may indicate a state. Embodiments of three possible states are as follows.

In a first state, if the NAV indicates idle and CCA has been idle for all secondary channels (e.g. secondary 20 MHz channel, secondary 40 MHz channel, and secondary 80 MHz channel) in the channel width indicated by the RTS frame's RXVECTOR parameter CH_BANDWIDTH_IN_NON_HT for a PIFS period prior to the start of the RTS frame 1202, then the STA shall respond with a CTS frame 1206 carried in a non-HT or non-HT duplicate PPDU after a SIFS period. The CTS frame's TXVECTOR parameters CH_BANDWIDTH and CH_BANDWIDTH_IN_NON_HT shall be set to the same value as the RTS frame's RXVECTOR parameter CH_BANDWIDTH_IN_NON_HT. Otherwise, the STA shall not respond with a CTS frame 1206.

In a second state, if the NAV indicates idle, then the STA shall respond with a CTS frame 1206 in a non-HT or non-HT duplicate PPDU after a SIFS period. The CTS frame's TXVECTOR parameters CH_BANDWIDTH and CH_BANDWIDTH_IN_NON_HT shall be set to any channel width for which CCA on all secondary channels has been idle for a PIFS prior to the start of the RTS frame 1202 and that is less than or equal to the channel width indicated in the RTS frame's RXVECTOR parameter CH_BANDWIDTH_IN_NON_HT. Otherwise, the STA shall not respond with a CTS frame 1206.

In a third state, if the NAV indicates idle, then the STA shall respond with a CTS frame 1206 in a non-HT or non-HT duplicate PPDU after a SIFS period. The CTS frame's TXVECTOR parameter CH_BANDWIDTH shall be set to any channel width for which CCA on all secondary channels has been idle for a PIFS prior to the start of the RTS frame 1202 and that is less than or equal to the channel width indicated in the RTS frame's RXVECTOR parameter CH_BANDWIDTH_IN_NON_HT, and the CTS frame's TXVECTOR parameter CH_BANDWIDTH_IN_NON_HT shall be set to the same value as the RTS frame's RXVECTOR parameter CH_BANDWIDTH_IN_NON_HT. Otherwise, the STA shall not respond with a CTS frame 1206.

In another embodiment, when a first STA transmits an RTS frame that indicates that more than one STA is allowed to respond with a CTS frame and receives the CTS frame, if the estimated transmission bandwidth of the received CTS frame is less than the received CTS frame's RXVECTOR parameter CH_BANDWIDTH_IN_NON_HT, the transmission bandwidth of following frame is not greater than the estimated transmission bandwidth of the received CTS frame.

In another embodiment, when a first STA receives an RTS frame, the RTS frame indicates that a first group of a plurality of STAs is allowed to respond with CTS frame, and the first STA is within the first group, the TXVECTOR parameter CH_BANDWIDTH of the CTS frame is different from TXVECTOR parameter CH_BANDWIDTH_IN_NON_HT of the CTS frame if a first condition is met. In such an embodiment, the first condition may be met when the channel width for which CCA on all secondary channels has been idle for a PIFS prior to the start of the RTS frame is narrower than the channel width indicated in the RTS frame's RXVECTOR parameter CH_BANDWIDTH_IN_NON_HT.

Figure 13:
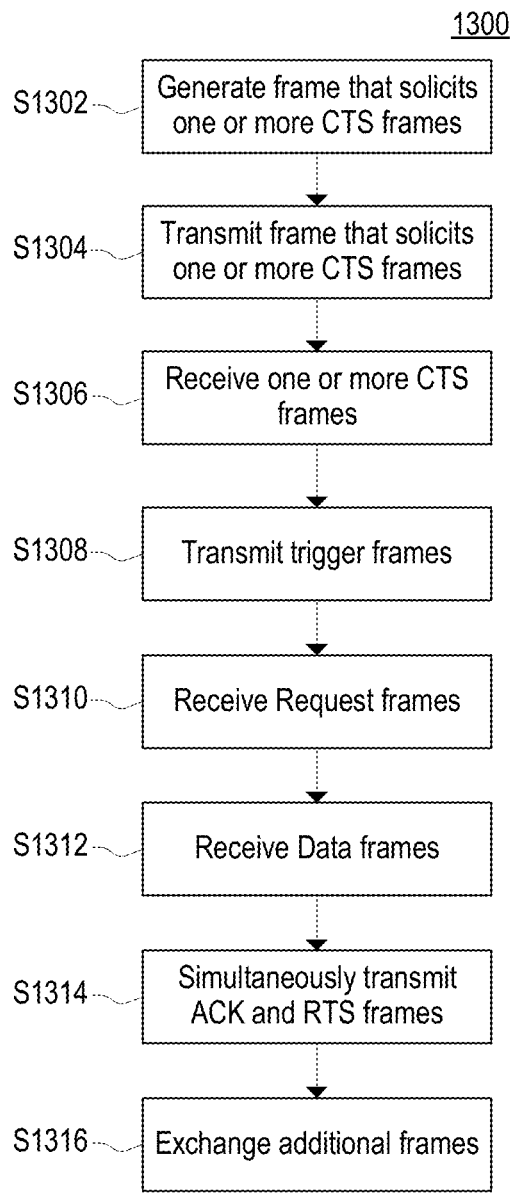
FIG. 13 illustrates a process for MU transmissions according to an embodiment.

FIG. 13 shows an embodiment of a wireless communication process 1300. FIG. 13 and process 1300 illustrate some of the steps that may be performed in various embodiments of this disclosure. However, process 1300 is not intended to be a process that is strictly followed from the first step to the last step—rather, process 1300 illustrates various elements that may be performed in various embodiments. Some embodiments may perform or not perform some portion of the steps of process 1300, as well as performing additional steps not explained in the following description. Therefore, the following description of process 1300 is illustrative and not limiting.

A control frame that solicits one or more CTS frames is generated at S1302. The control frame may be a Request-to-Send (RTS) frame or a multi-user (MU) RTS frame. The transmitter that generates the control frame at S1302 may be an AP operating in a particular BSS.

In an embodiment, generating the control frame includes generating a first control field for the control frame that specifies the intended receivers of the frame. For example, the first control field may correspond to a Receiver Address (RA) field located in a header of the control frame (e.g., a media access control (MAC) layer header or a physical (PHY) layer header). In other embodiments, the first control field may be an Association Identification (AID) field located in a payload section of the control frame. In some embodiments, the control frame may include both the RA field and the AID field. In any of these embodiments, the RA field and/or the AID field may include an address of a receiving/target station or a group address of receiving/target stations. In still more embodiments, the control frame may include multiple AID fields that individually list addresses of receiving/target stations of the control frame.

The first control field may indicate a set of conditions which, if satisfied by the receiver, compels the receiver to respond with a CTS frame. In some embodiments, the set of conditions may be predetermined and stored in the one or more receiving stations in the BSS instead of being indicated by the first control field. In an embodiment, one condition in the set of conditions is that the receiver is any STA that is in the same BSS as the transmitter. In such an embodiment, all STAs that receive the control frame with the first control field and belong to the same BSS as the AP respond with a CTS frame. In some embodiments, the set of conditions include the receiving device of the control frame has buffered data to transmit to the access point. In some embodiments, the set of conditions include the transmitter (e.g., the AP) of the control frame has buffered data to transmit to the receiver of the control frame.

Generating the frame at S1302 may include generating a second control field for the control frame that specifies a bandwidth over which the frame is transmitted, or an available bandwidth for a CTS response. The frame generated at S1302 may be a Trigger frame or an RTS frame. When the frame generated at S1302 is a Trigger frame, the Trigger frame may trigger additional response frames from the receiving STAs that indicate at least one of QoS parameters of the STAs and an amount of UL data buffered at the STAs.

After generating the frame, the frame, which may contain the first and second control fields, is transmitted at S1304. When the frame has the first field that designates devices that satisfy a set of conditions as receivers/responders, then those receivers respond to the frame a CTS frame. Accordingly, multiple STAs may transmit a CTS frame in response to the control frame. The CTS frames may include identical information and may be transmitted on the same or overlapping bandwidths such that they may be RF-combined. The AP receives the CTS frames at S1306. Since the CTS frames are RF-combined, the CTS frames are perceived as a single frame.

At S1308, The AP transmits a trigger frame to the STAs from which CTS frames were received at S1306. The trigger frame solicits at least one of information regarding an amount of buffered UL data to send and QoS parameters from receiving STAs. If the frame transmitted at S1302 was a trigger frame, then S1308 may be omitted.

The AP receives request frames from STAs with buffered UL data to send at S1310. The request frames may include QoS parameters for the STAs as well as am amount of UL data buffered at the STAs.

The AP receives data frames from STAs at S1312. In an embodiment, the data frames are triggered by the trigger frame at S1308.

The AP may simultaneously transmit acknowledgment and RTS frames at S1314. The acknowledgment frames may acknowledge successful receipt of the data frames received at S1312, while the RTS frames may solicit CTS frames from a plurality of STAs. In an embodiment, the set of STAs that are targets for the acknowledgment frames is different from the set of STAs that are targets for the RTS frames. In an embodiment, at least one of the ACK and RTS frames is a unicast frame.

Additional frames may be exchanged at S1316. The additional frames may include data frames, trigger frames, and acknowledgment frames.

Embodiments of the present disclosure result in many advantages that are improvements to the technology field of wireless communications. For example, embodiments may significantly reduce the overhead for RTS/CTS frame exchanges, especially when multiple cascaded MU transmissions are scheduled within a TXOP, and when each MU transmission has a different group of participating STAs. In addition, combining a plurality of CTS frames increase the protection for an AP, resulting in improved performance.

In embodiments in which a plurality of DL RTS frames that solicit RF-combined CTS frames from a plurality of STAs are simultaneously transmitted, a portion of a PPDU comprising RTS frames use the same scrambling seed, and the RTS frames solicit CTS frames using the same MCS level. As a result, Signaling overhead for the RTS/CTS frame exchange can be significantly reduced, especially when multiple cascaded MU transmissions are scheduled within a single TXOP and each MU transmission has a different group of participating STAs. In addition, RTS frame can be consolidated with other DL data frames using MPDU aggregation, which can improve wireless channel usage.

In some embodiments, RTS frames are transmitted in a plurality of channels, and CTS frames that respond to the RTS frames are transmitted in some portion of the plurality of channels. In such an embodiment, there is an increased chance that at least one of the STAs that is the target of the RTS frames will respond with a CTS frame that is received successfully by an AP.

FIG. 14 shows an embodiment of a process 1400 for protecting a shared wireless channel that may be performed by an AP. The AP generates a control frame at S1402. The control frame may be, for example, an RTS frame or a MU-RTS frame.

The control frame is addressed to a plurality of wireless devices. Therefore, generating the control frame at S1402 may include providing a group address in one or more fields of the control frame. For example, the group address may be provided in a Receiver Address field of the control frame, or in one or more Association Identification fields in a payload section of the control frame.

The control frame may solicit CTS frames from wireless devices that satisfy a set of conditions. In an embodiment, one condition of the set of conditions is that a receiving device of the control frame is in the same Basic Service Set (BSS) as the AP. Other conditions that may be in the set of conditions include that the receiving device of the control frame has buffered data to transmit to the AP, that the AP has buffered data to transmit to the receiving device of the control frame, and a receiving device of the control frame is seeking a random access channel for an uplink transmission.

The AP transmits the control frame at S1402.

The AP receives one or more CTS frames at S1406 in response to the transmitted control frame. The CTS frame may authorize the AP to perform a downlink transmission on a shared wireless channel.

The AP processes the one or more CTS frames at S1406. In an embodiment, a plurality of CTS frames that include identical information are transmitted simultaneously by a plurality of receiving devices. In one embodiment, the one or more of the CTS frames are identical and are RF-combined at the AP.

After receiving the CTS frames, the AP may transmit one or more trigger frame at S1410 to STAs that have data queued to transmit to the AP. The AP receives the queued data from the STAs that are the targets of the one or more trigger frames at S1412.

FIG. 15 shows an embodiment of a process 1500 for protecting a shared wireless channel for use by a wireless device. The wireless device may be a STA that is one of a plurality of STAs in the same BSS as an AP.

The wireless device receives a control frame from an AP with a group address at S1502. In an embodiment, the control frame is a Request-to-Send (RTS) frame or a multi-user (MU) RTS frame.

The wireless device processes the control frame at S1504. Processing the control frame may include processing the group address. The group address may be provided in a Receiver Address field of the control frame, or in one or more Association Identification fields located in a payload section of the control frame.

The control frame may solicit a CTS frame from any wireless device in a plurality of wireless devices that satisfies a set of conditions. In an embodiment, each CTS frame solicited by the control frame authorizes the AP to perform a downlink transmission on the shared wireless channel.

Processing the control frame at S1504 includes determining whether the wireless device is a target of the control frame by determining whether the wireless device satisfies at least one condition of the control frame. Possible conditions include that a device that receives the control frame is in the same Basic Service Set (BSS) as the AP, that the device that receives the control frame has buffered data to transmit to the AP, that the AP has buffered data to transmit to the device that receives the control frame, and that a device that receives the control frame is seeking a random access channel for an uplink transmission.

The wireless device transmits a CTS frame to the AP at S1506. The CTS frame may be transmitted at the same time as CTS frames from a plurality of STAs in the same BSS as the AP. The CTS frames transmitted by the STAs may include identical information, and in an embodiment, at least a portion of the CTS frames are transmitted on the same time and frequency resources as one another so that they are combined over-the-air. In such an embodiment, the AP may perceive identical portions of the CTS frames as a single CTS frame.

The wireless device receives a trigger frame from the AP at S1508. In response to the trigger frame, the wireless device transmits data to the AP at S1510.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of the next amendment of IEEE 802.11. Furthermore, some embodiments have been described with respect to a secondary channel, but embodiments are not limited thereto.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for protecting a shared wireless channel for use by an access point, the method comprising:
   generating, by the access point, a control frame that is addressed to a plurality of wireless devices, includes first information, and solicits a response, the first information including an indication of a transmission bandwidth of the control frame;
   transmitting, by the access point, the control frame to the plurality of wireless devices; and
   receiving, by the access point, a plurality of Clear-to-Send frames respectively transmitted in response to the control frame by respective wireless devices in the plurality of wireless devices that satisfy a set of conditions, wherein each Clear-to-Send frame authorizes the access point to perform a downlink transmission on the shared wireless channel, and wherein each Clear-to-Send frame is received at a same time and on a same frequency resource,
   wherein the plurality of Clear-to-Send frames are RF-combined,
   wherein each of the Clear-to-Send frames includes second information, the second information indicating the transmission bandwidth of the control frame indicated in the first information, and
   wherein information included in each of the Clear-to-Send frames consists of information identical to information included in each of the other Clear-to-Send frames.

2. The method of claim 1, wherein the control frame is a Request-to-Send (RTS) frame or a multi-user (MU) RTS frame.

3. The method of claim 2, wherein the control frame is addressed to the plurality of wireless devices using a group address associated with the plurality of wireless devices and provided in a Receiver Address field of the control frame.

4. The method of claim 2, wherein the control frame is addressed to the plurality of wireless devices using one or more Association Identification fields located in a payload section of the control frame.

5. The method of claim 1, wherein one condition of the set of conditions is that the receiving device of the control frame has buffered data to transmit to the access point.

6. The method of claim 1, wherein one condition in the set of conditions is that the access point has buffered data to transmit to the receiving device of the control frame.

7. The method of claim 2, wherein one condition in the set of conditions is that a receiving device of the control frame is seeking a random access channel for an uplink transmission.

8. A method for protecting a shared wireless channel for use by a wireless device, the method comprising:
   analyzing, by the wireless device, a control frame from an access point, the control frame being addressed to a plurality of wireless devices, the plurality of wireless devices including the wireless device, wherein the control frame includes first information and solicits a Clear-to-Send frame from each wireless device in the plurality of wireless devices that satisfies a set of conditions, wherein the first information including an indication of a transmission bandwidth of the control frame, wherein each Clear-to-Send frame authorizes the access point to perform a downlink transmission on the shared wireless channel;
   determining whether the set of conditions is satisfied; and
   transmitting, by the wireless device, a Clear-to-Send frame in response to the control frame and in response to matching a field of the control frame with an address associated with the wireless device and determining that the set of conditions is satisfied, the Clear-to-Send frame including includes second information, the second information indicating the transmission bandwidth of the control frame indicated in the first information,
   wherein the Clear to Send frame is transmitted at a same time and on a same frequency resource as another Clear-to-Send frame transmitted by another wireless device of the plurality of wireless devices so as to RF-combine with the other Clear-to-Send frame,
   wherein information included in each of the simultaneously transmitted Clear-to-Send frames, including the Clear-to-Send frame transmitted by the wireless device, consists of information identical to information included in each of the other Clear-to-Send frames.

9. The method of claim 8, wherein the control frame is a Request-to-Send (RTS) frame or a multi-user (MU) RTS frame.

10. The method of claim 9, wherein the control frame is addressed to the plurality of wireless devices using a group address associated with the wireless device and provided in a Receiver Address field of the control frame.

11. The method of claim 9, wherein the control frame is addressed to the plurality of wireless devices using one or more Association Identification fields including an Association Identifier associated with the wireless device and located in a payload section of the control frame.

12. The method of claim 8, wherein one condition of the set of conditions is that the device that receives the control frame has buffered data to transmit to the access point.

13. The method of claim 8, wherein one condition in the set of conditions is that the access point has buffered data to transmit to the device that receives the control frame.

14. The method of claim 9, wherein one condition in the set of conditions is that a device that receives the control frame is seeking a random access channel for an uplink transmission.

15. The method of claim 8, wherein the Clear-to-Send frame is transmitted on a bandwidth less than the transmission bandwidth of the control frame indicated in the first information.

16. The method of claim 8, further comprising:
   receiving the control frame on a plurality of 20 MHz channels;
   performing Clear Channel Assessment of the plurality of 20 MHz channels; and
   in response to a Network Allocation Vector indicating idle and the Clear Channel Assessment determining the one or more channels of the plurality of channels has been idle, transmitting the Clear to Send frame on the one or more channels determined to have been idle.

17. The method of claim 1, wherein one or more of the plurality of Clear-to-Send frames was transmitted on a bandwidth less than the transmission bandwidth of the control frame indicated in the first information.

18. The method of claim 1, wherein each wireless devices in the plurality of wireless devices is to determine whether to respond to the control frame by determining whether the set of conditions is satisfied.

19. A method for protecting a shared wireless channel for use by an access point, the method comprising:

generating, by the access point, a control frame that is addressed to a plurality of wireless devices, includes first information, and solicits a response, the first information including an indication of a state from a set of states, the set of states respectively indicating a condition based on availabilities of secondary channels;

transmitting, by the access point, the control frame to the plurality of wireless devices; and receiving, by the access point, a plurality of Clear-to-Send frames respectively transmitted in response to the control frame by respective wireless devices in the plurality of wireless devices that satisfy a set of conditions including the condition based on the availabilities of the secondary channels indicated in the first information, wherein each Clear-to-Send frame authorizes the access point to perform a downlink transmission on the shared wireless channel, and wherein each Clear-to-Send frame is received at a same time and on a same frequency resource, wherein the plurality of Clear-to-Send frames are RF-combined, wherein each of the Clear-to-Send frames includes second information, the second information including fields set according to the state indicated in the first information, and wherein information included in each of the Clear-to-Send frames consists of information identical to information included in each of the other Clear-to-Send frames.

20. The method of claim 19, wherein when the first information indicates a first state of the set of states, each of the Clear-to-Send frames is to be transmitted by a respective wireless device only when the Network Allocation Vector of the respective wireless device indicates idle; and wherein when the first information indicates a second state from the set of states, each of the Clear-to-Send frames is to be transmitted by the respective wireless device only when a Network Allocation Vector of the respective wireless device indicates idle and a Clear Channel Assessment of the respective wireless device has been idle for all secondary channels in the channel width occupied by the control frame.

* * * * *